(12) United States Patent
Sakoda et al.

(10) Patent No.: US 10,949,023 B2
(45) Date of Patent: Mar. 16, 2021

(54) TOUCH PANEL DEVICE, TOUCH PANEL DEVICE CONTROL METHOD, PROGRAM, AND STORAGE MEDIUM STORING THE PROGRAM

(71) Applicant: FANUC CORPORATION, Yamanashi (JP)

(72) Inventors: Yasumichi Sakoda, Yamanashi-ken (JP); Hiroyuki Kataya, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/656,689

(22) Filed: Oct. 18, 2019

(65) Prior Publication Data

US 2020/0125232 A1 Apr. 23, 2020

(30) Foreign Application Priority Data

Oct. 23, 2018 (JP) .............................. JP2018-199025

(51) Int. Cl.
*G06F 3/041* (2006.01)

(52) U.S. Cl.
CPC .................... *G06F 3/04186* (2019.05); *G06F 2203/04104* (2013.01)

(58) Field of Classification Search
CPC ...... G06F 3/041; G06F 3/04186; G06F 3/044; G06F 3/046
USPC ........................................................ 345/173
See application file for complete search history.

(56) References Cited

U.S. PATENT DOCUMENTS

2008/0165141 A1* 7/2008 Christie ................ G06F 3/0482
345/173
2013/0234960 A1* 9/2013 Yamamoto .............. G06F 3/041
345/173

FOREIGN PATENT DOCUMENTS

| JP | 2009003670 A | 1/2009 |
| JP | 2013-186648 A | 9/2013 |
| JP | 2014149796 A | 8/2014 |

* cited by examiner

*Primary Examiner* — Calvin C Ma
(74) *Attorney, Agent, or Firm* — Robert P. Michal, Esq.; Carter, DeLuca & Farrell LLP

(57) ABSTRACT

A touch panel device includes: an operation position obtaining unit for obtaining operation positions touched by operating members, the positions being determined based on signals outputted from a touch panel; an intersection determination unit for, when input is given by multi-touch operation, determining whether a first path and a second path intersect each other, the first path being a path of the operation position of one of the operating members, the second path being a path of the operation position of the other operating member; and a correction unit for, when the determination that the first path and the second path intersect each other is made, substituting the operation position of the one operating member for the operation position of the other operating member, and substituting the operation position of the other operating member for the operation position of the one operating member.

13 Claims, 10 Drawing Sheets

TOUCH PANEL DEVICE, TOUCH PANEL DEVICE CONTROL METHOD, PROGRAM, AND STORAGE MEDIUM STORING THE PROGRAM

CROSS-REFERENCE TO RELATED APPLICATION

This application is based upon and claims the benefit of priority from Japanese Patent Application No. 2018-199025 filed on Oct. 23, 2018, the contents of which are incorporated herein by reference.

BACKGROUND OF THE INVENTION

Field of the Invention

The present invention relates to a touch panel device capable of multi-touch operation, a control method for the touch panel device, a program, and a storage medium storing the program.

Description of the Related Art

Japanese Laid-Open Patent Publication No. 2013-186648 discloses an information processing device capable of multi-touch operation.

SUMMARY OF THE INVENTION

Information processing devices (touch panel devices) capable of multi-touch operation, such as the technique of Japanese Laid-Open Patent Publication No. 2013-186648, have the problem that, when a user is touching two points on the touch panel, the coordinates indicating the position of one point touched by the user and the coordinates indicating the position of the other point touched by the user might be erroneously detected so as to switch the coordinates around due to noise on the signal outputted from the touch panel.

The present invention has been made to solve the problem, and an object of the present invention is to provide a touch panel device that is capable of, during multi-touch operation, suppressing incorrect detection of operation positions on the touch panel that have been touched by operating members, a method for controlling the touch panel device, a program, and a storage medium storing the program.

According to a first aspect of the present invention, a touch panel device configured to allow a user to perform a multi-touch operation includes: a touch panel configured to output signals corresponding to positions touched by operating members; an operation position obtaining unit configured to obtain, as operation positions of the operating members, positions on the touch panel that are touched by the operating members, the positions on the touch panel being determined based on the signals outputted from the touch panel; an intersection determination unit configured to, when input is given by the multi-touch operation, determine whether a first path and a second path intersect each other, the first path being a path of the operation position of one operating member of the operating members, the second path being a path of the operation position of the other operating member; and a correction unit configured to, when the determination that the first path and the second path intersect each other is made, substitute the operation position of the one operating member obtained by the operation position obtaining unit for the operation position of the other operating member, and substitute the operation position of the other operating member obtained by the operation position obtaining unit for the operation position of the one operating member.

A second aspect of the present invention is directed to a method for controlling a touch panel device configured to allow a user to perform a multi-touch operation, the touch panel device including a touch panel configured to output signals corresponding to positions touched by operating members. The method includes: an operation position obtaining step of obtaining, as operation positions of the operating members, positions on the touch panel that are touched by the operating members, the positions on the touch panel being determined based on the signals outputted from the touch panel; an intersection determination step of, when input is given by the multi-touch operation, determining whether a first path and a second path intersect each other, the first path being a path of the operation position of one operating member of the operating members, the second path being a path of the operation position of the other operating member; and a correction step of, when the determination that the first path and the second path intersect each other is made, substituting the operation position of the one operating member obtained by the operation position obtaining step for the operation position of the other operating member, and substituting the operation position of the other operating member obtained by the operation position obtaining step for the operation position of the one operating member.

A third aspect of the present invention is directed to a program configured to cause a computer to execute the method for controlling the touch panel device according to the second aspect above.

A fourth aspect of the present invention is directed to a storage medium having stored therein a program configured to cause a computer to execute the method for controlling the touch panel device according to the second aspect above.

According to the present invention, it is possible to, during multi-touch operation, suppress incorrect detection of the operation positions on the touch panel that are touched by the operating members.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

First Embodiment

[Configuration of Touch Panel Device]

Figure 1:
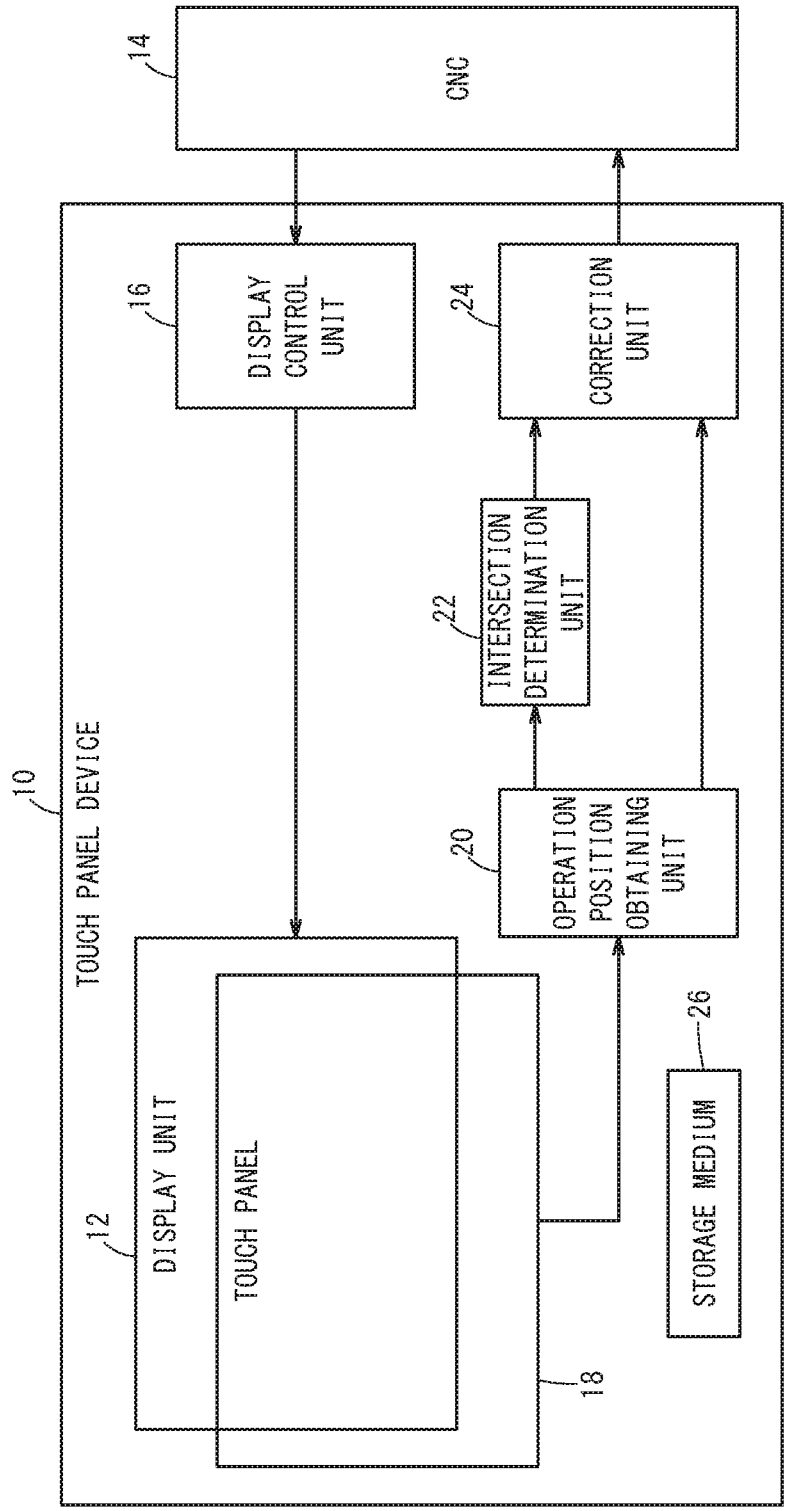
FIG. 1 is a block diagram showing the configuration of a touch panel device.

FIG. 1 is a block diagram showing the configuration of a touch panel device 10. The touch panel device 10 is an input device that allows a user to operate it by touching a position on a display unit 12 where pictures etc. are displayed by using an operating member(s) such as a finger(s) or stylus(es). The touch panel device 10 of this embodiment is used as an input device for a computer numerical control device (CNC) 14 for controlling a machine tool (not shown).

The touch panel device 10 includes the display unit 12, a display control unit 16, a touch panel 18, an operation position obtaining unit 20, an intersection determination unit 22, and a correction unit 24.

The display unit 12 can be a liquid-crystal display, for example, which displays icons through which the user enters commands to the numerical control device 14, information indicating conditions of the machine tool sent from the numerical control device 14, and so on. The display control unit 16 controls the display unit 12 according to requests from the numerical control device 14.

The touch panel 18 is a transparent film member or glass member bonded on the screen of the display unit 12. The touch panel 18 outputs signals according to positions touched by an operating member. The touch panel 18 of this embodiment is a touch panel that allows the user to perform multi-touch operation by using two operating members such as two fingers, two styluses, or the like.

From the signals outputted from the touch panel 18 in accordance with the positions touched by the operating members, the operation position obtaining unit 20 obtains as operation positions, the positions on the touch panel 18 that have been touched by the operating members.

Figure 3:
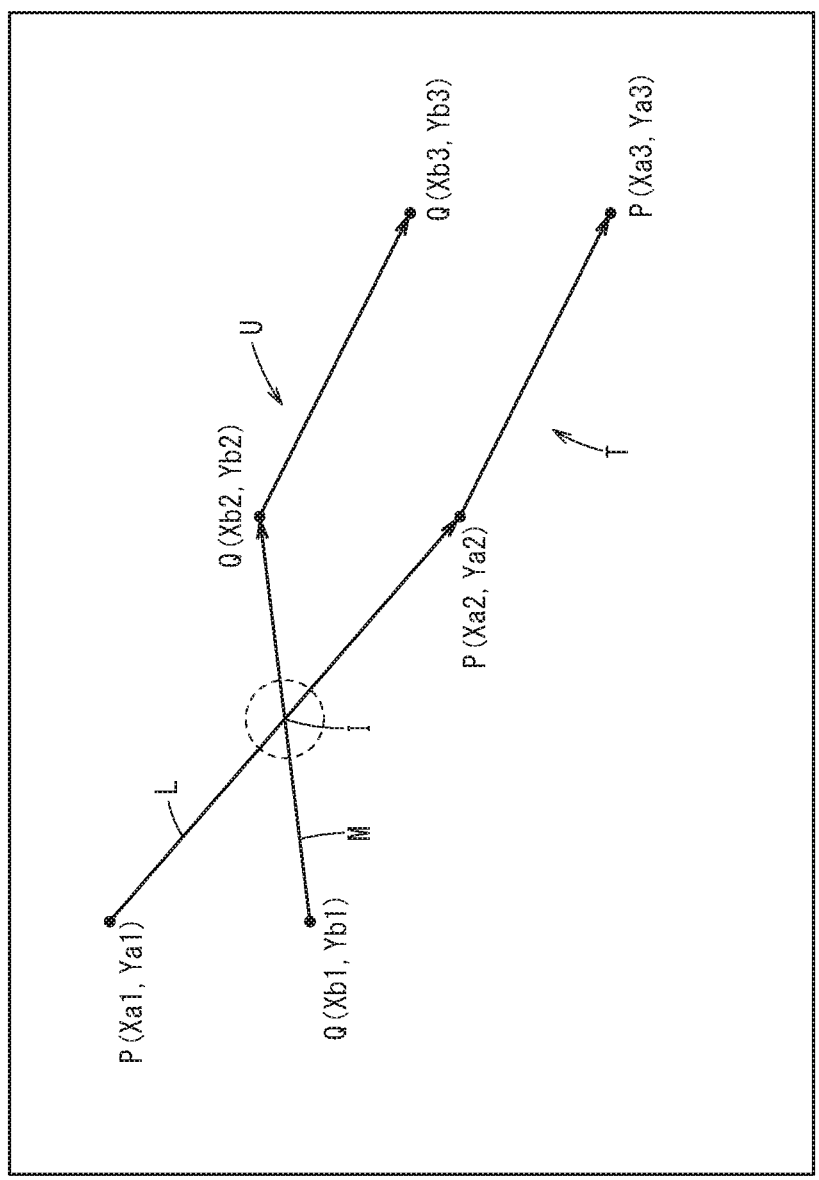
FIG. 3 is a diagram showing a first path and a second path on the touch panel.

The intersection determination unit 22 determines that a first path T and a second path U intersect each other, the first path T and the second path U being the respective paths of the operation positions touched by the two operating members, the operation positions being obtained by the operation position obtaining unit 20 (FIG. 3).

If the intersection determination unit 22 determines that the first path T and the second path U intersect, the correction unit 24 performs a correction by switching around the coordinates of the operation positions touched by the two operating members.

The display control unit 16, the operation position obtaining unit 20, the intersection determination unit 22, and the correction unit 24 are realized by programs stored in a storage medium 26 being executed by a computer.

[Intersection Determination Processing]

Figure 2:
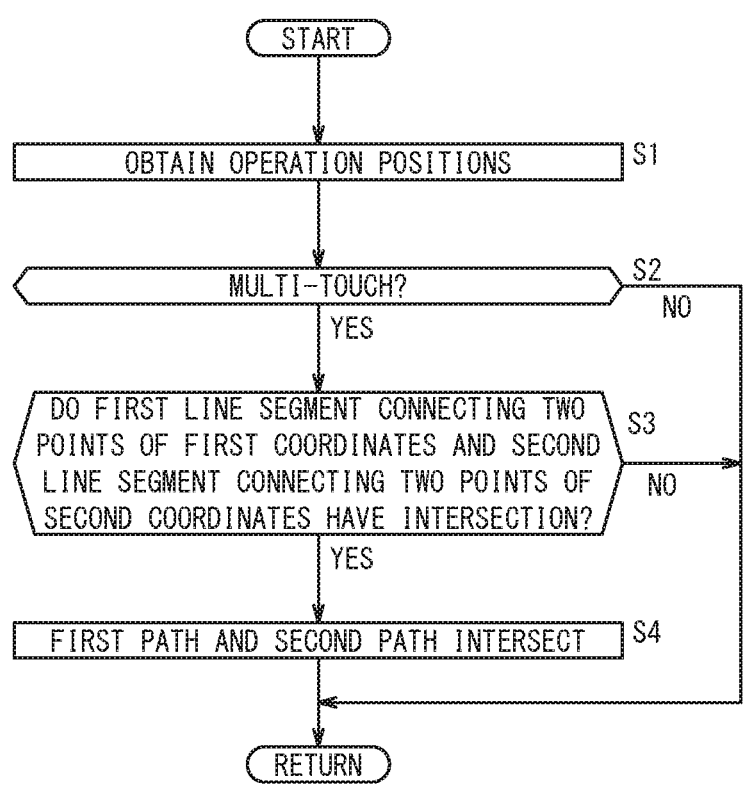
FIG. 2 is a flowchart showing the flow of intersection determination processing performed by an intersection determination unit.

FIG. 2 is a flowchart showing the flow of intersection determination processing performed by the intersection determination unit 22.

At step S1, the intersection determination unit 22 obtains an operation position(s) operated by the operating member(s) from the operation position obtaining unit 20.

At step S2, the intersection determination unit 22 determines whether a multi-touch operation, i.e., an operation by two operating members, is being performed. If a multi-touch operation is being performed, the process moves to step S3. If a multi-touch operation is not being performed, the process terminates.

At step S3, the intersection determination unit 22 regards the coordinates of operation positions by one of the two operating members as first coordinates P, and regards the coordinates of operation positions by the other of the two operating members as second coordinates Q (FIG. 3). Then, the intersection determination unit 22 determines whether a first line segment L that connects the previously-obtained first coordinates P and the currently-obtained first coordinates P and a second line segment M that connects the previously-obtained second coordinates Q and the currently-obtained second coordinates Q have an intersection I (FIG. 3). If the first line segment L and the second line segment M have an intersection I, the process moves to step S4. If the first line segment L and the second line segment M do not have an intersection I, the process terminates.

The time from when the first coordinates P were previously obtained to when the first coordinates P are currently obtained, and the time from when the second coordinates Q were previously obtained to when the second coordinates Q are currently obtained, are within a given period of time. This given time is set to be such a short time that it is difficult for the user to move the operating members such that the first path T and the second path U intersect.

At step S4, a determination that the first path T and the second path U intersect is made and the process ends.

FIG. 3 is a diagram showing the first path T and the second path U on the touch panel 18. The first path T is the line that connects the first coordinates P representing the operation positions touched by one of the two operating members. The second path U is the line that connects the second coordinates Q representing the operation positions touched by the other of the two operating members. The first coordinates P and the second coordinates Q are coordinates on a first coordinate system S1 having an X axis and Y axis, which are orthogonal on the touch panel 18.

In FIG. 3, the coordinates (Xa1, Ya1) are the first coordinates P that the operation position obtaining unit 20 obtained previously, the coordinates (Xa2, Ya2) are the first coordinates P that the operation position obtaining unit 20 obtained currently, and the coordinates (Xa3, Ya3) are the first coordinates P that the operation position obtaining unit 20 obtains next time. Similarly, in FIG. 3, the coordinates (Xb1, Yb1) are the second coordinates Q that the operation position obtaining unit 20 obtained previously, the coordinates (Xb2, Yb2) are the second coordinates Q that the operation position obtaining unit 20 obtained currently, and the coordinates (Xb3, Yb3) are the second coordinates Q that the operation position obtaining unit 20 obtains next time.

With the first path T and the second path U shown in FIG. 3, the first line segment L that connects the previously-obtained first coordinates P (Xa1, Ya1) and the currently-obtained first coordinates P (Xa2, Ya2), and the second line segment M that connects the previously-obtained second coordinates Q (Xb1, Yb1) and the currently-obtained second coordinates Q (Xb2, Yb2), have an intersection I. In this case, a determination that the first path T and the second path U intersect can be made.

[Correction Processing]

Figure 4:
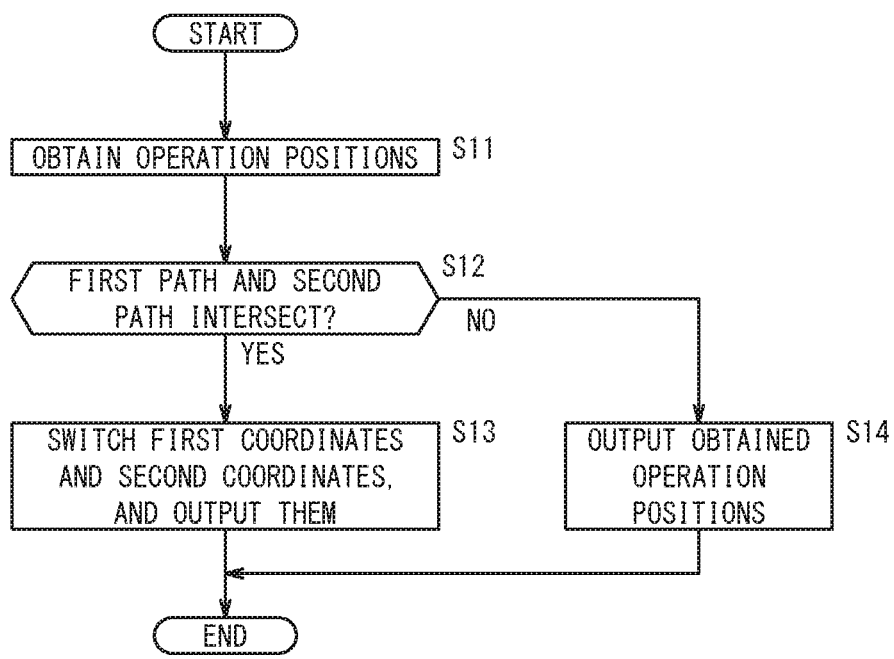
FIG. 4 is a flowchart showing the flow of correction processing performed by a correction unit.

FIG. 4 is a flowchart showing the flow of correction processing performed by the correction unit 24.

At step S11, the correction unit 24 obtains operation positions touched by the operating members from the operation position obtaining unit 20.

At step S12, the correction unit 24 determines whether the intersection determination unit 22 has determined that the first path T and the second path U intersect. If a determination that the first path T and the second path U intersect has been made, the process moves to step S13. If the first path T and the second path U are not determined to intersect, the process moves to step S14.

At step S13, the coordinate values of the first coordinates P and the coordinate values of the second coordinates Q of the operation positions obtained at step S11 are switched around and outputted.

At step S14, the operation positions obtained at step S11 are outputted as they are.

Figure 5:
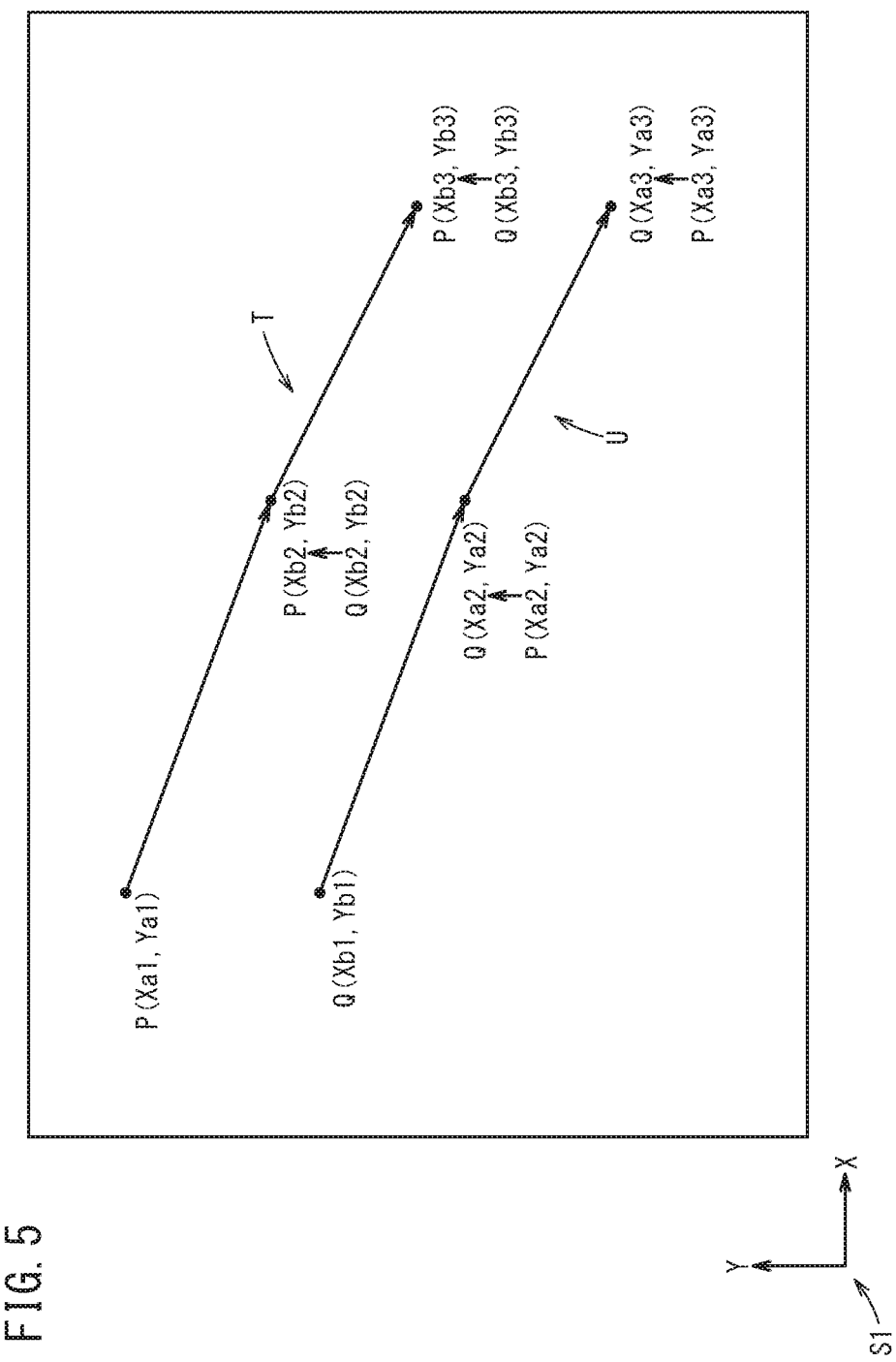
FIG. 5 is a diagram showing the first path and the second path after corrected by the correction unit.

FIG. 5 is a diagram showing the first path T and the second path U after having been corrected by the correction unit 24. After determining that the first path T and the second path U intersect, the correction unit 24 substitutes, for the first coordinates P, the coordinates (Xb2, Yb2) that the operation position obtaining unit 20 currently obtained as the second coordinates Q, and substitutes, for the second coordinates Q, the coordinates (Xa2, Ya2) that the operation position obtaining unit 20 currently obtained as the first coordinates P. Similarly, the correction unit 24 substitutes, for the first coordinates P, the coordinates (Xb3, Yb3) that the operation position obtaining unit 20 obtains next time as the second coordinates Q, and substitutes, for the second coordinates Q, the coordinates (Xa3, Ya3) that the operation position obtaining unit 20 obtains next time as the first coordinates P.

[Functions and Effects]

In the conventional touch panel device, problems sometimes occur that, when a user is performing a multi-touch operation, the operation positions touched by one operating member and the operation positions touched by the other operating member are detected such that the operation positions are switched around because of noise.

As such, according to the touch panel device 10 of this embodiment, when a determination is made that the first path T and the second path U intersect, the correction unit 24 causes operation positions touched by one operating member, which have been obtained by the operation position obtaining unit 20, to be treated as the operation positions touched by the other operating member, and causes the operation positions touched by the other operating member, which have been obtained by the operation position obtaining unit 20, to be treated as the operation positions touched by the one operating member. It is thus possible to correct the operation positions that have been incorrectly detected because of noise of the touch panel 18, so as to obtain the correct operation positions.

Further, according to the touch panel device 10 of this embodiment, the operation position obtaining unit 20 obtains the operation positions of one operating member as the first coordinates P on the first coordinate system S1, and obtains the operation positions of the other operating member as the second coordinates Q on the first coordinate system S1. Then, the intersection determination unit 22 determines that the first path T and the second path U intersect when the first line segment L connecting two points of the first coordinates P obtained by the operation position obtaining unit 20 and the second line segment M connecting two points of the second coordinates Q obtained by the operation position obtaining unit 20 have an intersection I. It is thus possible to determine that the first path T and the second path U intersect.

Furthermore, according to the touch panel device 10 of this embodiment, the intersection determination unit 22 determines that the first path T and the second path U intersect when the first line segment L connecting two points of the first coordinates P obtained by the operation position obtaining unit 20 within a given time period and the second line segment M connecting two points of the second coordinates Q obtained by the operation position obtaining unit 20 within the given time period have an intersection I. It is thus possible to determine that the first path T and the second path U intersect, while excluding cases in which the user voluntarily and intentionally operates the operating members such that the first path T and the second path U intersect.

Second Embodiment

A touch panel device 10 according to a second embodiment differs from the touch panel device 10 of the first embodiment in the contents of the processing by the intersection determination unit 22.

Figure 6:
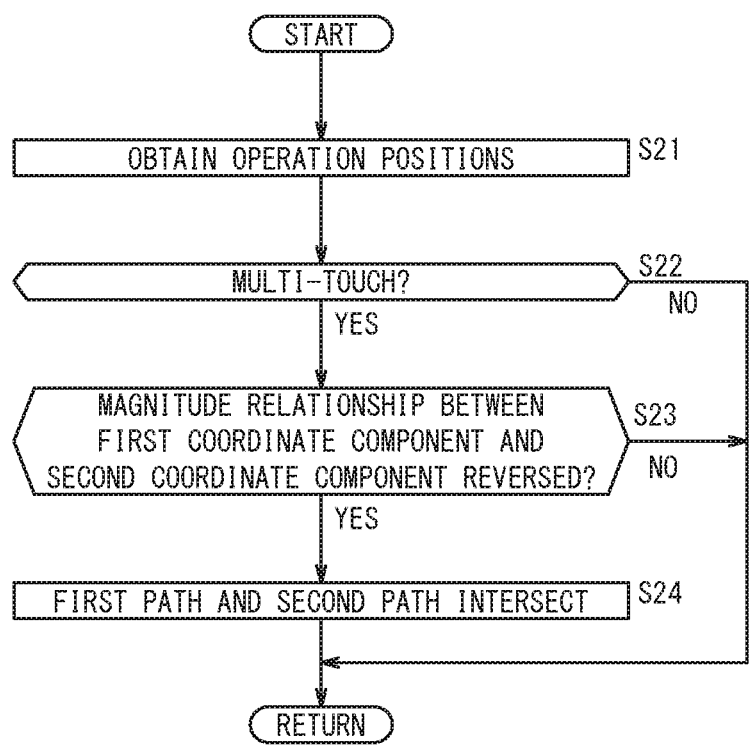
FIG. 6 is a flowchart showing the flow of intersection determination processing performed by an intersection determination unit.

FIG. 6 is a flowchart showing the flow of the intersection determination processing performed by the intersection determination unit 22.

At step S21, the intersection determination unit 22 obtains an operation position(s) touched by the operating member(s) from the operation position obtaining unit 20.

At step S22, the intersection determination unit 22 determines whether the operation is a multi-touch operation with two operation positions. In the case of multi-touch, the process move to step S23. If not multi-touch, the process terminates.

At step S23, when the coordinates of one of the two operation positions are represented by first coordinates P and the coordinates of the other operation position are represented by second coordinates Q, the intersection determination unit 22 determines whether the magnitude relationship between a component of the currently-obtained first coordinates P and the corresponding component of the currently-obtained second coordinates Q is opposite to the magnitude relationship between the component of the previously-obtained first coordinates P and the component of the previously-obtained second coordinates Q, i.e., whether the magnitude relationship between a component of the first coordinates P and a corresponding component of the second coordinates Q has been reversed. When the magnitude relationship between the component of the first coordinates P and the component of the second coordinates Q has been reversed, the process moves to step S24. When the magnitude relationship between the component of the first coordinates P and the component of the second coordinates Q has not been reversed, the process terminates.

The time from when the first coordinates P were previously obtained to when the first coordinates P are currently obtained, and the time from when the second coordinates Q were previously obtained to when the second coordinates Q are currently obtained, each are within a given period of time. This given period of time is set to such a short time that it is difficult for the user to operate (move) the operating member such that the first path T and the second path U intersect.

At step S24, a determination is made that the first path T and the second path U intersect, and the process terminates.

Figure 7:
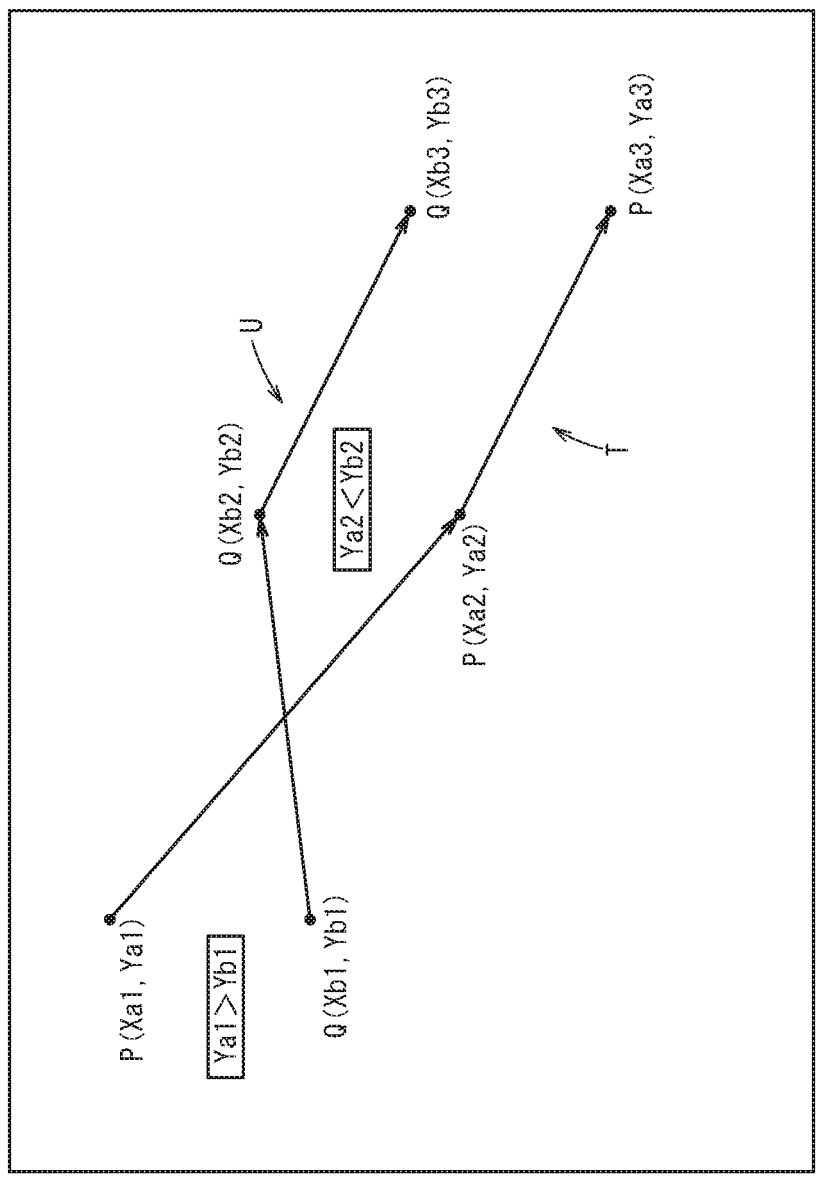
FIG. 7 is a diagram showing a first path and a second path on the touch panel.

FIG. 7 is a diagram showing a first path T and a second path U on the touch panel 18. The first path T is a line that connects the points defined by the first coordinates P representing the operation positions by one of the two operating members. The second path U is a line that connects the points defined by the second coordinates Q representing the operation positions by the other of the two operating members. The first coordinates P and the second coordinates Q are coordinates on a first coordinate system S1 having an X axis and Y axis that are orthogonal on the touch panel 18.

In FIG. 7, the coordinates (Xa1, Ya1) are the first coordinates P that the operation position obtaining unit 20 obtained the previous time, the coordinates (Xa2, Ya2) are the first coordinates P that the operation position obtaining unit 20 obtained this time, and the coordinates (Xa3, Ya3) are the first coordinates P that the operation position obtaining unit 20 obtains next time. Similarly, in FIG. 7, the coordinates (Xb1, Yb1) are the second coordinates Q that the operation position obtaining unit 20 obtained previous time, the coordinates (Xb2, Yb2) are the second coordinates Q that the operation position obtaining unit 20 obtained this time, and the coordinates (Xb3, Yb3) are the second coordinates Q that the operation position obtaining unit 20 obtains next time.

With the first path T and the second path U shown in FIG. 7, the magnitude relationship between the component Ya1 of the previously-obtained first coordinates P and the component Yb1 of the previously-obtained second coordinates Q is opposite to the magnitude relationship between the component Ya2 of the currently-obtained first coordinates P and the component Yb2 of the currently-obtained second coordinates Q. In this case, a determination can be made that the first path T and the second path U intersect.

[Functions and Effects]

According to the touch panel device 10 of this embodiment, the intersection determination unit 22 determines that the first path T and the second path U intersect if the magnitude relationship between a component of the first coordinates P and the component of the second coordinates Q obtained by the operation position obtaining unit 20 has been reversed. It is thus possible to determine that the first path T and the second path U intersect.

Further, according to the touch panel device 10 of this embodiment, a determination is made that the first path T and the second path U intersect if the magnitude relationship between a component of the first coordinates P and the component of the second coordinates Q obtained by the operation position obtaining unit 20 within a given time has been reversed. It is thus possible to determine that the first path T and the second path U intersect while excluding cases in which the user voluntarily and intentionally operates (moves) the operating members such that the first path T and the second path U intersect.

Third Embodiment

According to the touch panel device 10 of the second embodiment, the intersection determination unit 22 compares the magnitude relationships between the first coordinate P component and the second coordinate Q component on the first coordinate system S1. According to the touch panel device 10 of this embodiment, the intersection determination unit 22 compares the magnitude relationships between the first coordinate P component and the second coordinate Q component on a second coordinate system S2.

[Configuration of Touch Panel Device]

Figure 8:
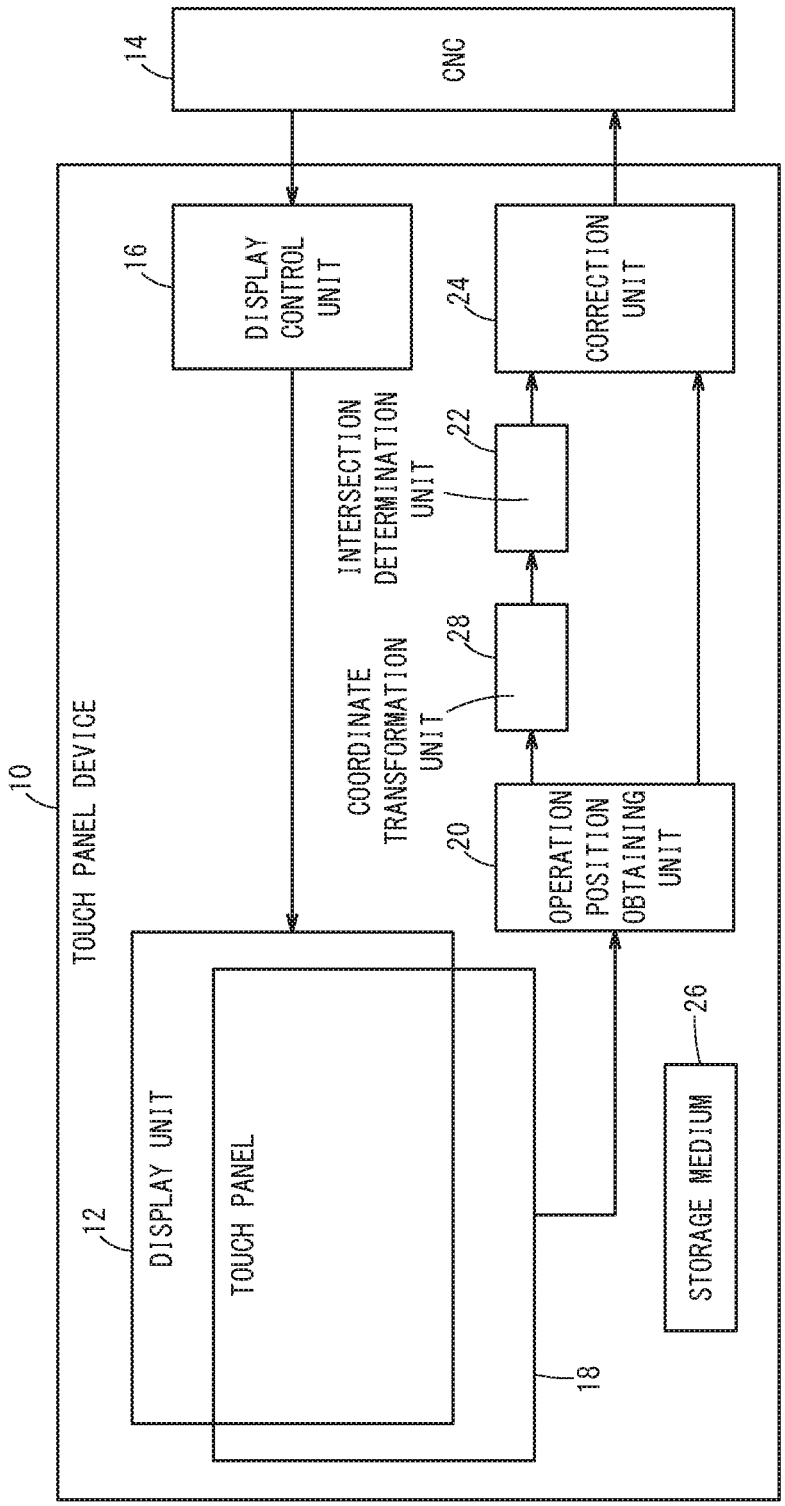
FIG. 8 is a block diagram showing the configuration of a touch panel device.

FIG. 8 is a block diagram showing the configuration of a touch panel device 10.

The touch panel device 10 of this embodiment includes a coordinate transformation unit 28. The coordinate transformation unit 28 transforms the coordinates of operation positions of the operating members on the first coordinate system S1 obtained by the operation position obtaining unit 20 into the coordinates on a second coordinate system S2.

The second coordinate system S2 has an X' axis parallel to the direction of movement along the first path T and the second path U and a Y' axis orthogonal to the X' axis.

The intersection determination unit 22 determines that the first path T and the second path U intersect based on the coordinates transformed onto the second coordinate system S2.

[Misjudgment of Intersection]

Figure 9:
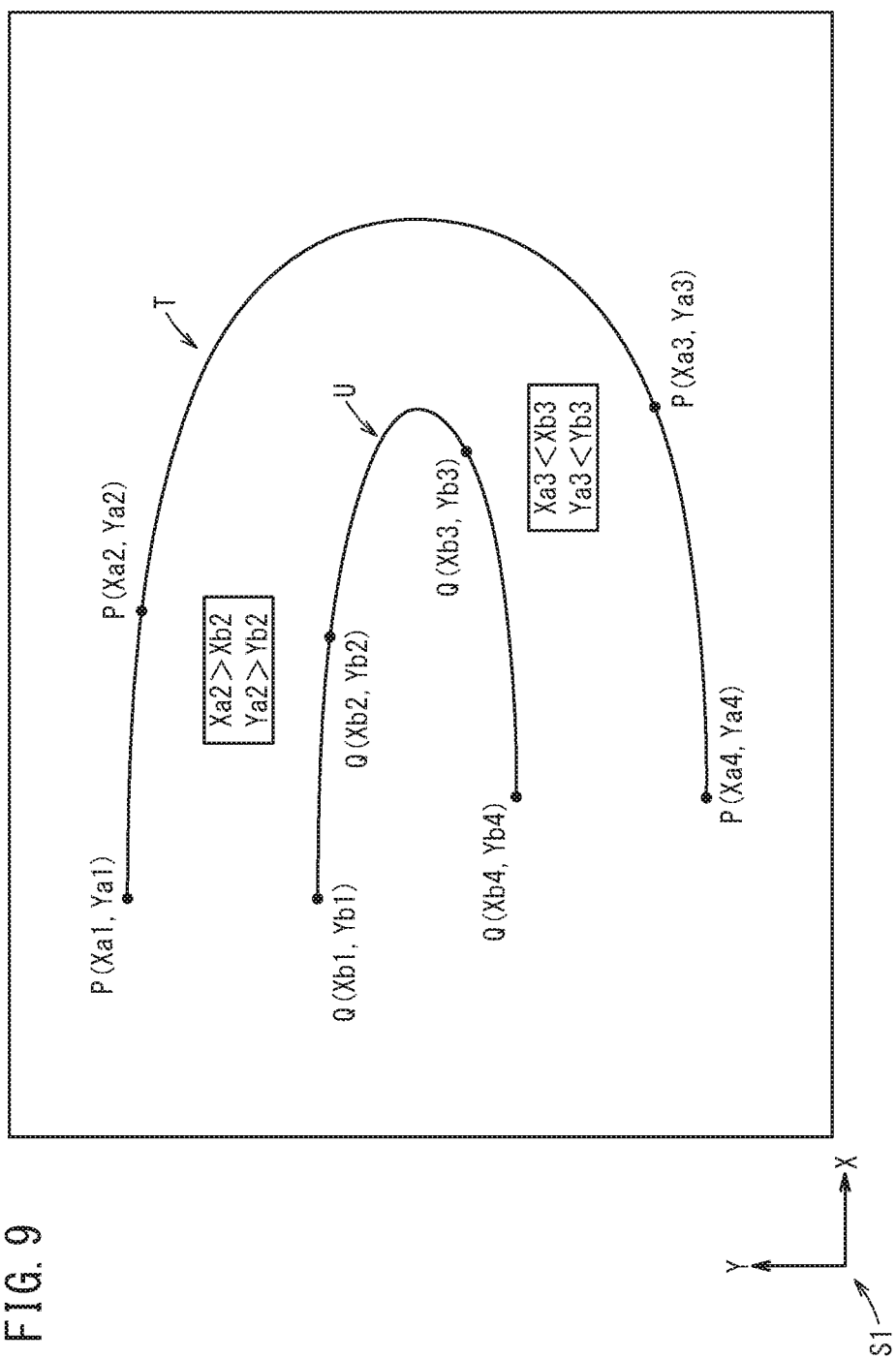
FIG. 9 is a diagram showing a first path and a second path on the touch panel.

FIG. 9 is a diagram showing a first path T and a second path U on the touch panel 18. FIG. 9 shows an operation in which the user has moved the operating members in a multi-touch manner such that they make a U-turn on the touch panel 18. When the operating members have been moved in such U-shaped courses, the intersection determination unit 22 of the second embodiment might erroneously determine that the first path T and the second path U intersect despite the fact that they actually do not intersect.

In FIG. 9, the coordinates (Xa1, Ya1) are the first coordinates P that the operation position obtaining unit 20 obtained at the time before last, the coordinates (Xa2, Ya2) are the first coordinates P that the operation position obtaining unit 20 obtained last time, the coordinates (Xa3, Ya3) are the first coordinates P that the operation position obtaining unit 20 obtained this time, and the coordinates (Xa4, Ya4) are the first coordinates P that the operation position obtaining unit 20 obtains next time. Similarly, in FIG. 9, the coordinates (Xb1, Yb1) are the second coordinates Q that the operation position obtaining unit 20 obtained at the time before last, the coordinates (Xb2, Yb2) are the second coordinates Q that the operation position obtaining unit 20 obtained last time, the coordinates (Xb3, Yb3) are the second coordinates Q that the operation position obtaining unit 20 obtained this time, and the coordinates (Xb4, Yb4) are the second coordinates Q that the operation position obtaining unit 20 obtains next time.

With the first path T and the second path U shown in FIG. 9, the magnitude relationship between the component Xa2 of the previously-obtained first coordinates P and the component Xb2 of the previously-obtained second coordinates Q is opposite to the magnitude relationship between the component Xa3 of the currently-obtained first coordinates P and the component Xb3 of the currently-obtained second coordinates Q. Furthermore, the magnitude relationship between the component Ya2 of the first coordinates P obtained last time and the component Yb2 of the second coordinates Q obtained last time is opposite to the magnitude relation between the component Ya3 of the first coordinates P obtained this time and the component Yb3 of the second coordinates Q obtained this time. As a result, even though the first path T and the second path U do not intersect as shown in FIG. 9, the intersection determination unit 22 of the second embodiment would erroneously determine that the first path T and the second path U intersect.

[Functions and Effects]

According to the touch panel device 10 of this embodiment, the coordinate transformation unit 28 transforms the first coordinates P and second coordinates Q into the coordinates on a second coordinate system S2 having an X' axis parallel to the direction of movement along the first path T and the second path U and a Y' axis parallel to a direction orthogonal to the X' axis. Then, the intersection determination unit 22 compares the magnitude relationships between the components of the transformed first coordinates P and the components of the transformed second coordinates Q to thereby determine that the first path T and the second path U intersect.

Figure 10:
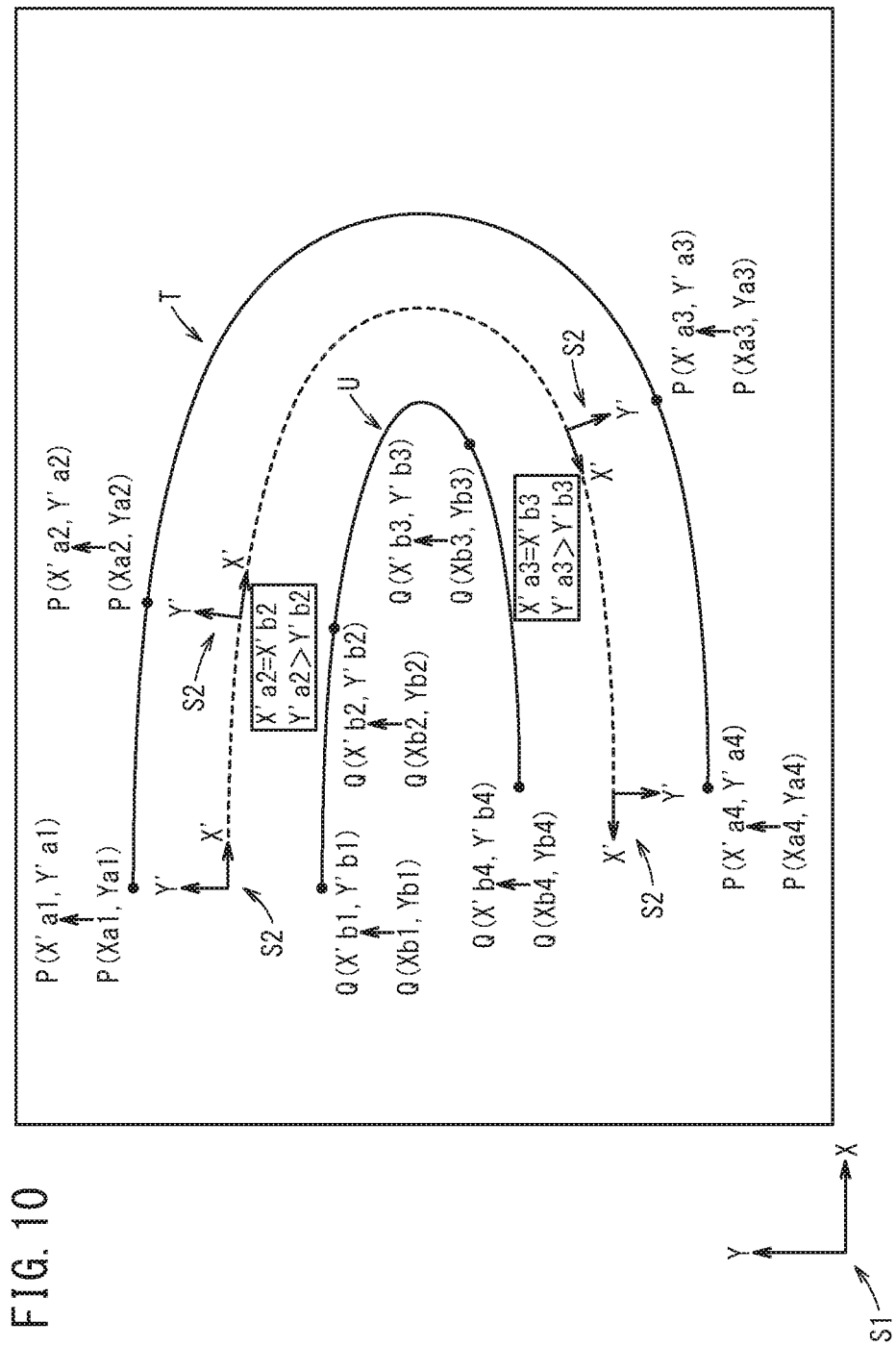
FIG. 10 is a diagram showing the first path and the second path on the touch panel.

FIG. 10 is a diagram showing the first path T and the second path U on the touch panel 18. In FIG. 10, the first coordinates P and second coordinates Q have been transformed to the coordinates on the second coordinate system S2.

With the first path T and the second path U shown in FIG. 10, the magnitude relationship between the component X'a2 of the first coordinates P (X'a2, Y'a2) obtained last time and the component X'b2 of the second coordinates Q (X'b2, Y'b2) obtained last time is the same as the magnitude relationship between the component X'a3 of the first coordinates P (X'a3, Y'a3) obtained this time and the component X'b3 of the second coordinates Q (X'b3, Y'b3) obtained this time. Further, the magnitude relationship between the component Y'a2 of the first coordinates P (X'a2, Y'a2) obtained last time and the component Y'b2 of the second coordinates Q (X'b2, Y'b2) obtained last time is the same as the magnitude relationship between the component Y'a3 of the first coordinates P (X'a3, Y'a3) obtained this time and the component Y'b3 of the second coordinates Q (X'b3, Y'b3) obtained this time. Therefore, the intersection determination unit 22 of this embodiment does not determine that the first path T and the second path U intersect. It is thus possible to suppress misjudgment (erroneous determination) as to whether the first path T and the second path U intersect.

Incidentally, the touch panel device 10 of the second embodiment works or functions satisfactorily in cases where it is not expected that the user would move the operating members in U-shaped courses on the touch panel 18 in a multi-touch condition.

[Technical Ideas Obtained from Embodiments]

Technical ideas that can be grasped from the above-described embodiments will be recited below.

The touch panel device (10) configured to allow a user to perform a multi-touch operation includes: a touch panel (18) configured to output signals corresponding to positions touched by operating members; an operation position obtaining unit (20) configured to obtain, as operation positions of the operating members, positions on the touch panel that are touched by the operating members, the positions on the touch panel being determined based on the signals outputted from the touch panel; an intersection determination unit (22) configured to, when input is given by the multi-touch operation, determine whether a first path (T) and a second path (U) intersect each other, the first path being a path of the operation position of one operating member of the operating members, the second path (U) being a path of the operation position of the other operating member of the operating members; and a correction unit (24) configured to, when the determination that the first path and the second path intersect each other is made, substitute the operation position of the one operating member obtained by the operation position obtaining unit for the operation position of the other operating member, and substitute the operation position of the other operating member obtained by the operation position obtaining unit for the operation position of the one operating member. It is thus possible to correct operation positions incorrectly detected due to noise of the touch panel and obtain the correct operation positions.

In the above-described touch panel device, the operation position obtaining unit may be configured to obtain each operation position of the one operating member as first coordinates (P) on a first coordinate system (S1) having coordinate axes that are mutually orthogonal on the touch panel, and obtain each operation position of the other operating member as second coordinates (Q) on the first coordinate system, and the intersection determination unit may be configured to determine that the first path and the second path intersect each other when a line segment (L) connecting two points represented by the first coordinates obtained by the operation position obtaining unit and a line segment (M) connecting two points represented by the second coordinates obtained by the operation position obtaining unit have an intersection (I). It is thus possible to determine that the first path and the second path intersect.

In the above-described touch panel device, the intersection determination unit may be configured to determine that the first path and the second path intersect each other when a line segment connecting two points represented by the first coordinates obtained by the operation position obtaining unit within a given time period and a line segment connecting two points represented by the second coordinates obtained by the operation position obtaining unit within the given time period have an intersection. It is thus possible to determine that the first path and the second path intersect while excluding cases in which the user voluntarily and intentionally causes the first path and the second path to intersect by operating the operating members.

In the above-described touch panel device, the operation position obtaining unit may be configured to obtain each operation position of the one operating member as first coordinates on a first coordinate system having coordinate axes that are mutually orthogonal on the touch panel, and obtain each operation position of the other operating member as second coordinates on the first coordinate system, and the intersection determination unit may be configured to determine that the first path and the second path intersect each other when a magnitude relationship between a component of the first coordinates obtained by the operation position obtaining unit and the corresponding component of the second coordinates obtained by the operation position obtaining unit has been reversed. It is thus possible to determine that the first path and the second path intersect.

In the above-described touch panel device, the intersection determination unit may be configured to determine that the first path and the second path intersect each other when a magnitude relationship between a component of the first coordinates obtained by the operation position obtaining unit within a given time period and the corresponding component of the second coordinates obtained by the operation position obtaining unit within the given time period has been reversed. It is thus possible to determine that the first path and the second path intersect while excluding cases in which the user causes the first path and the second path to intersect by operating the operating members.

The above-described touch panel device may further include a coordinate transformation unit (28) configured to transform the first coordinates and the second coordinates into coordinates on a second coordinate system (S2) having a coordinate axis parallel to a direction of movement along the first path and the second path and a coordinate axis parallel to a direction orthogonal to the direction of movement, and the intersection determination unit may be configured to compare magnitude relationships between a component of the transformed first coordinates and the corresponding component of the transformed second coordinates. It is thus possible to suppress misjudgment as to whether the first path and the second path intersect.

A method for controlling a touch panel device (10) configured to allow a user to perform a multi-touch operation, the touch panel device including a touch panel (18) configured to output signals corresponding to positions touched by operating members, includes: an operation position obtaining step of obtaining, as operation positions of the operating members, positions on the touch panel that are touched by the operating members, the positions on the touch panel being determined based on the signals outputted from the touch panel; an intersection determination step of, when input is given by the multi-touch operation, determining whether a first path (T) and a second path (U) intersect each other, the first path being a path of the operation position of one operating member of the operating members, the second path (U) being a path of the operation position of the other operating member; and a correction step of, when the determination that the first path and the second path intersect each other is made, substituting the operation position of the one operating member obtained by the operation position obtaining step for the operation position by the other operating member, and substituting the operation position of the other operating member obtained by the operation position obtaining step for the operation position of the one operating member. It is thus possible to correct operation positions incorrectly detected due to noise of the touch panel and obtain the correct operation positions.

In the above-described touch panel device control method, the operation position obtaining step may obtain each operation position of the one operating member as first coordinates (P) on a first coordinate system (S1) having coordinate axes that are mutually orthogonal on the touch panel, and obtain each operation position of the other operating member as second coordinates (Q) on the first coordinate system, and the intersection determination step may determine that the first path and the second path intersect each other when a line segment (L) connecting two points represented by the first coordinates obtained by the operation position obtaining step and a line segment (M) connecting two points represented by the second coordinates obtained by the operation position obtaining step have an intersection (I). It is thus possible to determine that the first path and the second path intersect.

In the above-described touch panel device control method, the intersection determination step may determine that the first path and the second path intersect each other when a line segment connecting two points represented by the first coordinates obtained by the operation position obtaining step within a given time period and a line segment connecting two points represented by the second coordinates obtained by the operation position obtaining step within the given time period have an intersection. It is thus possible to determine that the first path and the second path intersect while excluding cases in which the user operates the operating members with the intention of causing the first path and the second path to intersect each other.

In the above-described touch panel device control method, the operation position obtaining step may obtain each operation position of the one operating member as first coordinates on a first coordinate system having coordinate axes that are mutually orthogonal on the touch panel, and obtain each operation position of the other operating member as second coordinates on the first coordinate system, and the intersection determination step may determine that the first path and the second path intersect each other when a magnitude relationship between a component of the first coordinates obtained by the operation position obtaining step and the corresponding component of the second coordinates obtained by the operation position obtaining step has been reversed. It is thus possible to determine that the first path and the second path intersect.

In the above-described touch panel device control method, the intersection determination step may determine that the first path and the second path intersect each other when a magnitude relationship between a component of the first coordinates obtained by the operation position obtaining step within a given time period and the corresponding component of the second coordinates obtained by the operation position obtaining step within the given time period has been reversed. It is thus possible to determine that the first path and the second path intersect while excluding cases in which the user operates the operating members with the intention of causing the first path and the second path to intersect each other.

The above-described touch panel device control method may further include a coordinate transformation step of transforming the first coordinates and the second coordinates into coordinates on a second coordinate system (S2) having a coordinate axis parallel to a direction of movement along the first path and the second path and a coordinate axis parallel to a direction orthogonal to the direction of the movement, and the intersection determination step may compare magnitude relationships between a component of the transformed first coordinates and the corresponding component of the transformed second coordinates. It is thus possible to suppress misjudgment as to whether the first path and the second path intersect.

A program configured to cause a computer to execute the above-described method for controlling the touch panel device (10) is provided. It is thus possible to correct operation positions incorrectly detected due to noise of the touch panel (18) and obtain the correct operation positions.

A storage medium (26) having stored therein a program configured to cause a computer to execute the above-described touch panel device (10) control method is provided. It is thus possible to correct operation positions incorrectly detected due to noise of the touch panel and obtain the correct operation positions.

The present invention is not particularly limited to the embodiment described above, and various modifications are possible without departing from the essence and gist of the present invention.

What is claimed is:

1. A touch panel device configured to allow a user to perform a multi-touch operation, comprising:
   a touch panel configured to output signals corresponding to positions touched by operating members;
   an operation position obtaining unit configured to obtain, as operation positions of the operating members, positions on the touch panel that are touched by the operating members, the positions on the touch panel being determined based on the signals outputted from the touch panel;
   an intersection determination unit configured to, when input is given by the multi-touch operation, determine whether a first path and a second path intersect each other, the first path being a path of the operation position of one operating member of the operating members, the second path being a path of the operation position of another operating member of the operating members; and
   a correction unit configured to, when a determination that the first path and the second path intersect each other is made, substitute the operation position of the one operating member obtained by the operation position obtaining unit for the operation position of the other operating member, and substitute the operation position of the other operating member obtained by the operation position obtaining unit for the operation position of the one operating member.

2. The touch panel device according to claim 1,
wherein the operation position obtaining unit is configured to obtain each operation position of the one operating member as first coordinates on a first coordinate system having coordinate axes that are mutually orthogonal on the touch panel, and obtain each operation position of the other operating member as second coordinates on the first coordinate system, and the intersection determination unit is configured to determine that the first path and the second path intersect each other when a line segment connecting two points represented by the first coordinates obtained by the operation position obtaining unit and a line segment connecting two points represented by the second coordinates obtained by the operation position obtaining unit have an intersection.

3. The touch panel device according to claim 2, wherein the intersection determination unit is configured to determine that the first path and the second path intersect each other when a line segment connecting two points represented by the first coordinates obtained by the operation position obtaining unit within a given time period and a line segment connecting two points represented by the second coordinates obtained by the operation position obtaining unit within the given time period have an intersection.

4. The touch panel device according to claim 1,
wherein the operation position obtaining unit is configured to obtain each operation position of the one operating member as first coordinates on a first coordinate system having coordinate axes that are mutually orthogonal on the touch panel, and obtain each operation position of the other operating member as second coordinates on the first coordinate system, and the intersection determination unit is configured to determine that the first path and the second path intersect each other when a magnitude relationship between a component of the first coordinates obtained by the operation position obtaining unit and a corresponding component of the second coordinates obtained by the operation position obtaining unit has been reversed.

5. The touch panel device according to claim 4, wherein the intersection determination unit is configured to determine that the first path and the second path intersect each other when a magnitude relationship between a component of the first coordinates obtained by the operation position obtaining unit within a given time period and a corresponding component of the second coordinates obtained by the operation position obtaining unit within the given time period has been reversed.

6. The touch panel device according to claim 4, further comprising a coordinate transformation unit configured to transform the first coordinates and the second coordinates into coordinates on a second coordinate system having a coordinate axis parallel to a direction of movement along the first path and the second path and a coordinate axis parallel to a direction orthogonal to the direction of movement, wherein the intersection determination unit is configured to compare magnitude relationships between a component of the transformed first coordinates and a corresponding component of the transformed second coordinates.

7. A method for controlling a touch panel device configured to allow a user to perform a multi-touch operation, the touch panel device including a touch panel configured to output signals corresponding to positions touched by operating members, the method comprising:

an operation position obtaining step of obtaining, as operation positions of the operating members, positions on the touch panel that are touched by the operating members, the positions on the touch panel being determined based on the signals outputted from the touch panel;

an intersection determination step of, when input is given by the multi-touch operation, determining whether a first path and a second path intersect each other, the first path being a path of the operating position of one operating member of the operating members, the second path being a path of the operation position of another operating member of the operating members; and a correction step of, when a determination that the first path and the second path intersect each other is made, substituting the operation position of the one operating member obtained by the operation position obtaining step for the operation position of the other operating member, and substituting the operation position of the other operating member obtained by the operation position obtaining step for the operation position of the one operating member.

8. The method for controlling the touch panel device, according to claim 7,
wherein the operation position obtaining step obtains each operation position of the one operating member as first coordinates on a first coordinate system having coordinate axes that are mutually orthogonal on the touch panel, and obtains each operation position of the other operating member as second coordinates on the first coordinate system, and the intersection determination step determines that the first path and the second path intersect each other when a line segment connecting two points represented by the first coordinates obtained by the operation position obtaining step and a line segment connecting two points represented by the second coordinates obtained by the operation position obtaining step have an intersection.

9. The method for controlling the touch panel device, according to claim 8, wherein the intersection determination step determines that the first path and the second path intersect each other when a line segment connecting two points represented by the first coordinates obtained by the operation position obtaining step within a given time period and a line segment connecting two points represented by the second coordinates obtained by the operation position obtaining step within the given time period have an intersection.

10. The method for controlling the touch panel device, according to claim 7,
wherein the operation position obtaining step obtains each operation position of the one operating member as first coordinates on a first coordinate system having coordinate axes that are mutually orthogonal on the touch panel, and obtains each operation position of the other operating member as second coordinates on the first coordinate system, and the intersection determination step determines that the first path and the second path intersect each other when a magnitude relationship between a component of the first coordinates obtained by the operation position obtaining step and a corresponding component of the second coordinates obtained by the operation position obtaining step has been reversed.

11. The method for controlling the touch panel device, according to claim 10, wherein the intersection determination step determines that the first path and the second path intersect each other when a magnitude relationship between a component of the first coordinates obtained by the operation position obtaining step within a given time period and a corresponding component of the second coordinates obtained by the operation position obtaining step within the given time period has been reversed.

12. The method for controlling the touch panel device, according to claim 10, further comprising a coordinate transformation step of transforming the first coordinates and the second coordinates into coordinates on a second coordinate system having a coordinate axis parallel to a direction of movement along the first path and the second path and a coordinate axis parallel to a direction orthogonal to the direction of movement,
   wherein the intersection determination step compares magnitude relationships between a component of the transformed first coordinates and a corresponding component of the transformed second coordinates.

13. A non-transitory storage medium having stored therein a program configured to cause a computer to execute the method for controlling the touch panel device according to claim 7.

* * * * *